Jan. 1, 1952 J. C. COPELAND 2,581,000
MAGNIFYING REFLECTION VIEWER FOR STEREOSCOPIC PICTURES
Filed April 6, 1946 3 Sheets-Sheet 1

INVENTOR.
Jacob C. Copeland
BY
ATTORNEYS

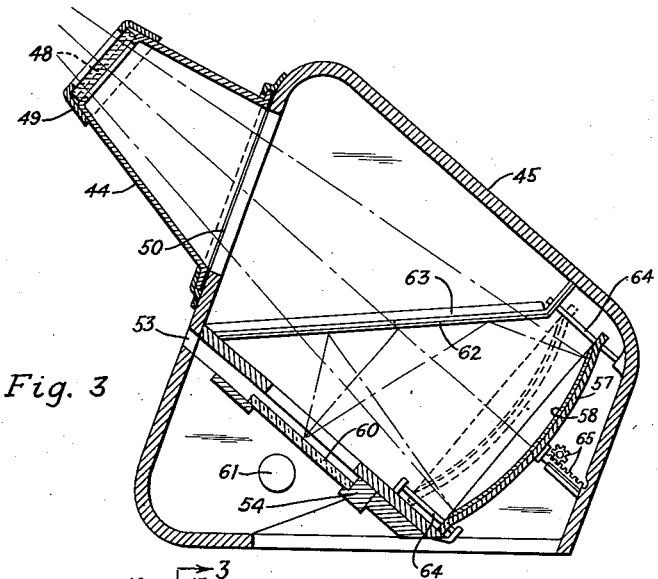
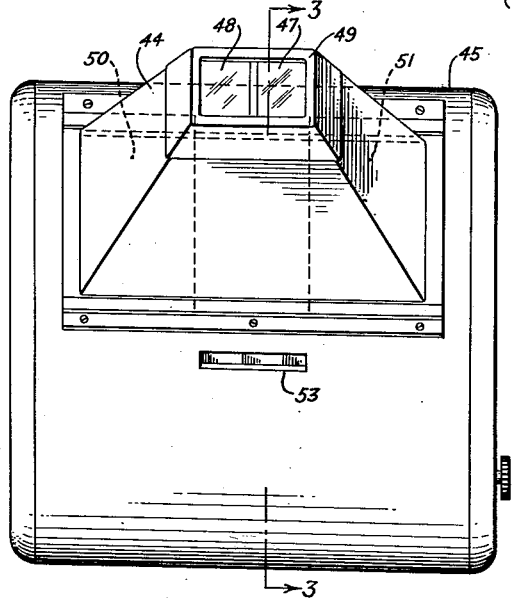

Jan. 1, 1952  J. C. COPELAND  2,581,000
MAGNIFYING REFLECTION VIEWER FOR STEREOSCOPIC PICTURES
Filed April 6, 1946  3 Sheets-Sheet 3
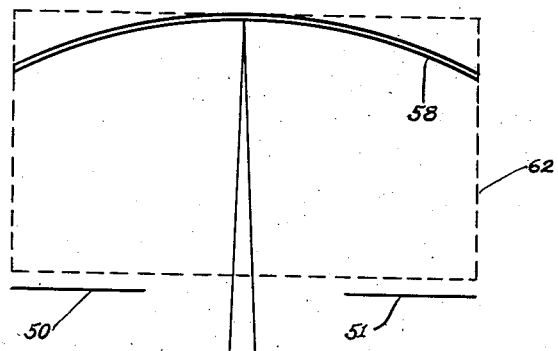
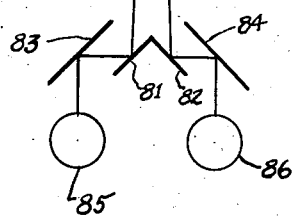
Fig. 9
INVENTOR.
Jacob C. Copeland
BY
ATTORNEYS

Patented Jan. 1, 1952

2,581,000

UNITED STATES PATENT OFFICE 2,581,000

MAGNIFYING REFLECTION VIEWER FOR STEREOSCOPIC PICTURES

Jacob C. Copeland, Chicago, Ill.

Application April 6, 1946, Serial No. 660,129

9 Claims. (Cl. 88—29)

My invention relates to a magnifying viewer having an unusually large viewing aperture for magnifying and examining small photographic images with both eyes; more particularly my invention relates to a viewer having new and unusual properties of image magnification produced by a reflecting system.

This application is a continuation-in-part of my application No. 428,487, filed January 28, 1942 now abandoned.

It is the object of my invention to magnify small transparencies or prints generally and especially photographic images either in the form of transparencies or prints, so that the magnified image can be viewed with both eyes without partial occlusion of the field of either eye.

It is another object of my invention to obtain binocular vison of such magnified images.

It is a further object of my invention to produce a high and variable magnification of such images.

It is still a further object of my invention to so magnify images in a reflecting system having a large viewing aperture that an apparent stereoscopic effect is obtained because of a slight disparity between the two ocular images.

It is still a further object of my invention to provide a magnified viewer which is free from chromatic aberration and relatively light in weight as compared with the refracting systems for magnification commonly employed in this art.

It is still a further object of my invention to provide a compact and economical device for comfortable and magnified viewing of small images.

It is still a further object of my invention to provide a stereoscopic or three dimensional viewer.

It is still a further object of my invention to provide a viewer which is substantially free from the aberrations known as "curvature of field," "distortion" and "chromatic aberration."

It is still a further object of my invention to provide a viewer which is adjustable to alleviate discomfort of those observers having such ocular muscle anomalies as esophoria (tendency inward) and exophoria (tendency outward).

The magnifying viewer of my invention both illuminates and magnifies small images such as microfilm, reduced photostats, etc. It can be used for the examination of dental and medical X-rays and photographs, and can be employed, as will be pointed out herein, for viewing transparencies or opaque objects.

Another object of my invention is to produce a device which is adapted for magnifying images of the fluorescent screen of a cathode-ray oscilloscope such as used in television receiving sets.

These and further objects of my invention will be apparent from a consideration of the drawings, a specific description of which here follows:

Figure 3 is a cross sectional view of a modified form of my invention for use in viewing stereoscopic or three dimensional pictures.

Figure 4 is a front view of a modified stereoscopic viewer of my invention.

Figures 5 to 8 are diagrammatic representations of the viewing mechanics of the viewers shown in Figures 3 and 4.

Figure 9 is a diagrammatic view of a modified apparatus showing how base-in prismatic effect is produced by mirrors.

Figure 1:
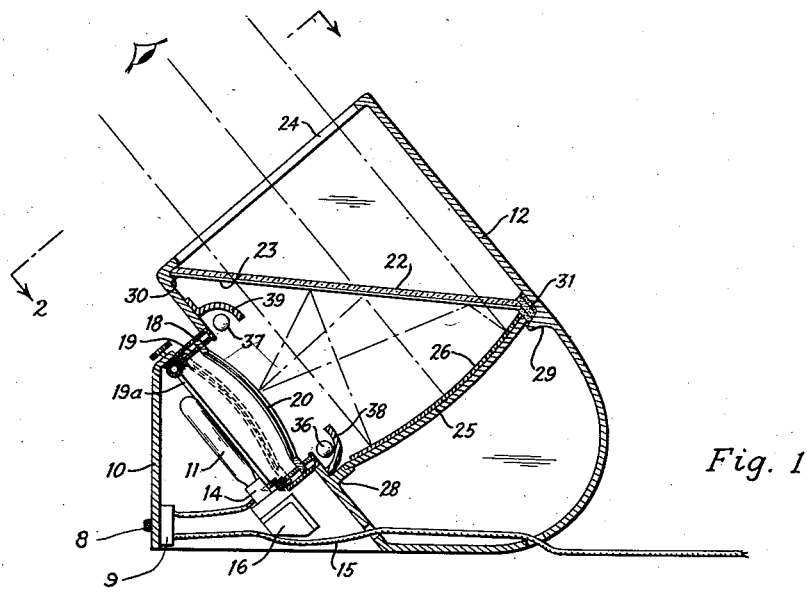
Figure 1 is a cross section of the magnifying viewer of my invention showing all the pertinent structure thereof.

Referring now more specifically to the drawings, in Figure 1 I show a lamp housing 10 which has the dual function of enclosing the light source 11 and also supporting and properly positioning the main housing 12 which contains the mirror magnification system. The housing 10 is formed as shown so as to support the main housing 12 at an angle of between 30 and 45 degrees to the horizontal. Preferably I support the device so that the system is maintained at an angle of about 40 degrees to the horizontal. The light source 11 enclosed in the housing 10 is mounted in a suitable socket 14 and is supplied with a source of current through wire 15. Between the socket 14 and the wire 15 there is preferably inserted a variable resistance element 9 which is controllable by a knob 8 so that the amount of illumination can be varied. The socket may be supported by any suitable structure such as the bracket 16.

In the opening between the main housing 12 and the housing for the light source 11, a means 18 for supporting the picture to be viewed is situated. In this particular figure this supporting means 18 comprises a glass sandwich which is curved slightly in one direction as shown, and has a slot between the two pieces of glass forming the sandwich for receiving and positively holding the picture to be viewed. This sandwich 18 is supported for parallel movement toward and from the opening between the housing in the pinion gear mechanism 19, 19a and 19b. The support in this figure is curved for the purpose of compensating at least in part for the aberrations, known as "curvature of field," and "distortion," of the reflecting magnifying system. The lower part of the glass sandwich may be opal flashed glass or some other light diffusing or translucent material such as ground glass. Equivalent sheet plastic material may be substituted for one or both of the glass sheets of the sandwich. The upper part of the glass sandwich is obviously transparent. In the main housing 12 a semi-transparent plate 22 is positioned diagonally across the housing 12 and the lower inner surface of this diagonally placed mirror 22 carries a semi-transparent coating 23 which coating may be of aluminum or silver or reflecting alloys of the type of chromium-nickel alloys. This diagonally positioned semi-transparent plate 22 is set at an angle of about 45° with respect to the aperture 24 and with respect to the concave mirror 25 which has a surface coating 26 of some suitable metal such as aluminum or silver. Instead of the semi-transparent plate 22 a pelicular mirror may be employed. The mirror 25 is a concave spherical mirror while the diagonally placed mirror 22 is a plano-mirror. The mirror 25 is supported by brackets 30 and 31. These brackets may either be integrally formed in the housing 12 or may be suitably attached thereto. To prevent the transmission of shocks to the mirror system 22 and 25 I may employ rubber fittings directly in contact with the mirrors to support the same in their proper position.

As a further feature of my invention, my device is adapted to view opaque photographic prints. Such opaque prints may be viewed by inserting such photographic prints in the slot or track of supporting means 18 and impinging on the face thereof light from the light sources 36 and 37 which light sources are partially surrounded by reflecting shields 38 and 39 which in addition to reflecting light onto the image to be viewed prevent light from these light sources from unduly interfering with the reflecting system.

The operation of my device is schematically illustrated in Figure 1 and is particularly described as follows:

Light from the light source 11 is diffused as it passes through the lower or diffusing plate of the glass sandwich 19 whereupon it spreads and passes through the object 20 which may be a transparent or translucent photographic image. This object is then reflected by the flat semi-transparent mirror surface 23 of the diagonal 22 to the spherical or concave mirror surface 26 of the mirror 25. The mirror 25 reflects and magnifies the image fom 20 and directs it through the semi-transparent plate 22 and through the aperture 24 to the eyes, one of which is shown diagrammatically in front of the aperture 24.

The reflected rays pass through the semi-transparent plate or pelicular film 22 because the coating 23 is one which can both reflect and transmit light rays directed thereupon.

Figure 2:
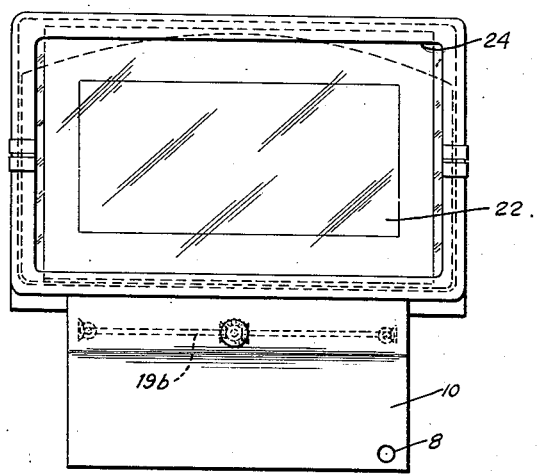
Figure 2 is a front view taken along the lines 2—2 of Figure 1.

The mirror has a uniform spherical curvature. In Figure 2, a section of the spherical mirror which is substantially rectangular in shape and is broader horizontally than it is vertically is employed. The mirror of Figure 2, for example, may be about 70% wider than it is high and the width is preferably at least equal to twice the pupilary distance of the eyes or at least 5 to 6 inches wide. This is necessary to properly view a rectangular image with both eyes and is a very essential feature of this invention.

It is also very important that the mirror 25 be a surface coated mirror.

Within the last eight or ten years, physicists have developed vacuum equipment for the evaporation of metals. When polished glass surfaces are placed within the vacuum jars, a deposition of the evaporated metal upon the surface produces surface coated mirrors. It has only been during the last seven years that apparatus large enough to produce mirrors of the size used in my viewer has been available. The metals used for the first time as mirrors are aluminum and chromium. Both of these metals lend themselves to the evaporation process and could not be deposited by chemical deposition previously.

The front surface mirrors now available by this process are superior to anything previously known. The only previous surface coated mirrors were made with silver by chemical deposition. Silver mirrors are perishable and required thin coatings or lacquer to give them any degree of durability. The new evaporated metallic films are resistant to atmospheric conditions and make the construction of a device such as mine practical. A back coated silver mirror would produce a secondary image which would be quite objectionable.

It is essential that the concave mirror be front surface coated. A back surfaced concave mirror would have the effect of producing a ghost image, thus destroying the function of the instrument. If metal were deposited on the back surface of a concave mirror in which both surfaces are approximately parallel, the difference in radii of the two surfaces would produce a different magnification for each of their respective images, which would cause an overall blurring of the primary image from the reflecting surface.

Because of the exposure of a surface coated mirror to atmospheric conditions, it is necessary to use metals other than silver. These other metals can be applied to the surface by an evaporation process.

In place of the glass sandwich 18 with the picture therein and light 11, there may be substituted the cathode ray oscilloscope with the fluorescent screen thereof placed at the position of the glass sandwich 18.

The optical system of my device is ordinarily so arranged that the object is either at the focal point or at a distance slightly inside the focal point of the mirror 25 and when this object is inside the focal point it gives divergent exit rays which meet the convergence of the two visual axes psychologically induced by the "awareness of nearness." Preferably as shown the object is adjustable relative to the spherical mirror as by the gearing means 19, 19a and 19b.

Because the image is reflected by mirrors and more particularly front surface mirrors, the optical system is free from chromatic aberration. By the use of the curved sandwich holding device the aberrations of "curvature of field" and "distortion" are cured, at least in part.

The magnification obtained by the concave mirror system here described is obtained with a mirror having a longer radius of curvature than the radius of curvature of a refracting system of the same power. Thus a larger diameter of viewing aperture can be obtained as well as a marked decrease in weight in the mirror system as opposed to the refracting system. The advantages of the large aperture are many. The large aperture enables both eyes to be used without partial occlusion of the image of each eye as is produced in small aperture systems.

Another important advantage of the large aperture as set out in this system is the fact that binocular vision is obtained.

A further feature of this large aperture is that both eyes can comfortably view the image in the normal manner of use of the eyes so that undue strain and tiring effects are avoided. By making the image supporting means 18 adjustable it is also possible to alleviate discomfort of observer's having such ocular muscle anomalies as esophoria (tendency inward) and exophoria (tendency outward). An observer with esophoria, for example, will ordinarily have his discomfort alleviated by moving the object forward of the focal point.

The viewer of my invention is distinguished further by the fact that it is a protected mirror system in that the front surface mirrors, namely diagonal and concave mirrors, are so positioned that the mirror surface is protected from abrasion as from dust and other foreign matter and thus long life of the mirrors and good quality of the image is insured. This avoidance of abrasion is extremely important because in a mirror system of this type, particularly a front surface mirror, cleaning, even in the presence of ordinary dust, can result in a destructive abrasion.

According to a modified form of my invention, shown in Figures 3 and 4, I provide a stereoscopic or three-dimensional viewer. Basically the structure is substantially that shown in Figures 1 and 2, but in addition I provide an enclosed hood 44 mounted on a housing 45 with prisms 47 and 48 mounted in the eye piece holder 49. In some convenient place, for example, where the hood joins the main housing, I provide two occluders 50 and 51 which are properly positioned to occlude the unnecessary two outer images of the pictures as will be more particularly set out hereinafter.

Another feature of my apparatus is that I provide two separate slots for inserting and removing the pictures. One slot or track 53 runs from the front to the back of the viewer and into this track may be put single pictures for viewing. Additionally I provide a track 54 shown in Figure 3 which extends transversely from one side to the other of the viewer and in this track a multiplicity of pictures may be viewed at a single time such as a plurality of dental X-rays or two pictures for the production of a stereoscopic image.

The optical set up of the viewer is similar to that described in connection with Figure 1. It consists of a housing 45, which is so shaped that the image or images to be magnified, as will be described later, are directed toward the eye located at the eye piece 49 at an angle which is normal to and comfortable for the eye. A transparency 60 located on the track 54 is illuminated by light from the light source 61 and I may, as previously described, interpose a light diffusing means between the light source and the transparency. The resulting image is then reflected by the flat mirror surface 62 of the semi-transparent mirror 63. This image is reflected from the mirror surface 62 on to the concave mirror 57, which has a reflecting surface coating 58 and which directs the image from the transparency 60 through the semi-transparent mirror 63 towards the eye positioned at the eye piece 49. The diagonal mirror 63 may be suitably supported and protected against shock by proper fittings. In this modification the mirror is moveably supported in the proper position by the pins 64 and by the rack and pinion device 65 which also is adapted to adjust the distance of the mirror from the object. This makes it possible to alleviate the discomfort of observers having such ocular muscle anomalies as esophoria or exiphoria in a similar way to that described above in connection with the description of the adjustable image holding objective 19.

For stereoscopic use I place two stereoscopic pictures in the un-transposed position shown in Figure 5. The two pictures so placed in the viewer and viewed through the two prisms 47 and 48, positioned base-in, overlap because the image of the two pictures seen by the right eye seem to be displaced towards the apex of the prism or to the right as shown in Figure 6. The dotted lines indicate the original position of the image and the solid lines indicate the displaced position of the image caused by viewing it with the prism in base-in position with the right eye.

The image of two pictures seen by the left eye is displaced toward the apex of the prism or to the left as shown in Figure 7 in which the dotted line similarly shows the original position and the solid line shows the image displaced for the left eye. The prisms thus cause both eyes to see their respective displaced images with the right and left pictures being overlapped as shown in Figure 8. This overlapped position leaves a right picture extending on the left side and a left picture extending on the right side of these non-overlapped right and left pictures are occluded by means of occluders 51 and 50 shown in Figure 4.

Thus the only images viewed are the overlapped images and the brain fuses these overlapped images and obtains a stereoscopic impression.

My stereoscopic viewer accordingly comprises a compact efficient mirror system for magnifying and viewing stereoscopic images. Because of the mirror system employed and the arrangement of the mirrors, the surface coatings are protected against abrasion and wear and deteriorating external influences thus providing a long and satisfactory life for the apparatus.

Obviously the stereoscopic viewer can also be employed with two stereoscopically arranged television tubes replacing the two stereoscopic views to produce three dimensional television images.

Figure 9 shows diagrammatically how to obtain a "base-in" prismatic effect similar to that obtained in Figures 3 to 8 by substituting a system of mirrors for the base-in prisms 47 and 48 of Figure 4. In this figure 58 represents the concave mirror, 62 the semi-transparent mirror surface and 50 and 51 are occluders or septums similar to those of Figure 4. The image from any suitable source such as from a transparency, from an opaque print or from the fluorescent screen of a cathode ray oscilloscope, which has been reflected by the semi-transparent mirror 62 upon the spherical mirror 58 is reflected by the latter onto the mirror system 81, 82, 83, 84 and then to the left and right eyes 85 and 86 respectively. The angle between the mirrors 81 and 82 is adjustable. The mechanism by which only the over-lapped images of the two streoscopic views are viewed is the same as that illustrated in Figures 5 to 8 in connection with the description of Figures 3 and 4.

I wish it to be understood that I do not desire to be limited to the exact details of construction shown and described for obvious modifications will occur to a person skilled in the art.

I claim:

1. A stereoscopic viewer comprising means for positioning two stereoscopic pictures in untransposed position; means for illuminating said pictures; a viewer housing; a semi-transparent plate positioned diagonally across said viewer housing, said semi-transparent plate having a semi-transparent reflecting coating, said semi-transparent plate being positioned at about an angle of 45° with respect to said picture positioning means; a concave mirror positioned on one side of said semi-transparent plate and adjacent said semi-transparent plate at an angle of about 45° thereto; an aperture in said viewer housing on the opposing side of said semi-transparent plate; a hood supported by said viewer housing; means for producing a base-in prismatic effect positioned in the eye piece of said hood; two occluders positioned between said means for producing the base-in prismatic effect and said concave mirror to occlude only the two outermost images of the pictures leaving the overlapped central images for the eyes to view.

2. A device such as set forth in claim 1 comprising adjustable means for mounting the mirror whereby the optical distance between the mirror and the picture can be adjusted.

3. A device as set forth in claim 1 comprising means for adjusting the optical distance between said concave mirror and said picture positioning means.

4. A stereoscopic viewer comprising means for positioning two stereoscopic pictures in untransposed position; means for illuminating said pictures; a viewer housing; a semi-transparent plate positioned diagonally across said viewer housing, said semi-transparent plate having a semi-transparent reflecting coating on one surface thereof and being positioned at about an angle of 45° with respect to said picture positioning means; a concave mirror having a reflecting surface coating positioned on one side of said semi-transparent plate and adjacent said semi-transparent plate at an angle of about 45° thereto; an aperture in said viewer housing on the opposing side of said semi-transparent plate, said semi-transparent plate and said concave mirror being so supported in said viewer housing that the surface coatings on said semi-transparent plate and said concave mirror are protected against abrasion and dust; a hood supported by said viewer housing; two prisms positioned base-in in the eye piece of said hood; two occluders positioned between said prisms and said concave mirror to occlude the two outermost images of said pictures leaving only the overlapped central images for the eyes to view.

5. A device such as set forth in claim 4 comprising means for adjusting the optical distance between the object or picture and the concave spherical mirror.

6. A device such as set forth in claim 4 comprising adjustable means for mounting the mirror whereby the optical distance between the mirror and the picture can be adjusted.

7. A device as set forth in claim 4 comprising means for adjusting the optical distance between said concave mirror and said picture positioning means.

8. The device of claim 1 in which the means for positioning the stereoscopic pictures comprises means for curving two opposite edges of the pictures away from the diagonal mirror.

9. A magnifying viewer comprising a housing, a surface-coated concave mirror at one side of said housing with its concave surface facing inward, a semi-transparent plate substantially coextensive with said concave mirror and at an angle of about 45° thereto, a hood supported by said housing opposite to and in line with the axis of said concave mirror, an eye piece in said hood, means in said eye piece to produce base-in prismatic effect, means in the side between the semi-transparent mirror and the concave mirror for forming two stereoscopic images on said semi-transparent mirror, two occluders positioned between the semi-transparent mirror and the eye piece to occlude only the two outermost of the two stereoscopic images leaving the overlapped central images for the eyes to view.

JACOB C. COPELAND.

REFERENCES CITED

The following references are of record in the file of this patent:

UNITED STATES PATENTS

| Number | Name | Date |
| --- | --- | --- |
| 1,082,678 | Casler | Dec. 30, 1913 |
| 1,349,018 | Terashima | Aug. 10, 1920 |
| 1,440,457 | Girdansky | Jan. 2, 1923 |
| 1,476,290 | Fiske | Dec. 4, 1923 |
| 1,616,857 | Hyde | Feb. 8, 1927 |
| 1,900,557 | Holcombe | Mar. 7, 1933 |
| 1,958,036 | Draper | May 8, 1934 |
| 1,992,872 | Mahler | Feb. 26, 1935 |
| 2,002,074 | Basson | May 21, 1935 |
| 2,093,520 | Hayashi | Sept. 21, 1937 |
| 2,113,397 | Croft | Apr. 5, 1938 |
| 2,165,078 | Toulon | July 4, 1939 |
| 2,167,453 | Hillman | July 25, 1939 |
| 2,172,775 | Ott et al. | Sept. 12, 1939 |
| 2,211,376 | Isbell | Aug. 13, 1940 |
| 2,211,480 | Ring | Aug. 13, 1940 |
| 2,297,322 | Rasco | Sept. 29, 1942 |
| 2,313,204 | Morelle | Mar. 9, 1943 |
| 2,313,562 | Mainardi et al. | Mar. 9, 1943 |
| 2,375,669 | McKinney | May 8, 1945 |

FOREIGN PATENTS

| Number | Country | Date |
| --- | --- | --- |
| 400,182 | France | May 24, 1909 |
| 463,891 | Great Britain | Apr. 8, 1937 |